United States Patent [19]
Lamb

[11] Patent Number: 4,760,544
[45] Date of Patent: Jul. 26, 1988

[54] ARITHMETIC LOGIC AND SHIFT DEVICE

[75] Inventor: Kenneth J. Lamb, Plympton, England

[73] Assignee: Plessey Overseas Limited, Ilford, England

[21] Appl. No.: 876,533

[22] Filed: Jun. 20, 1986

[51] Int. Cl.[4] .............................................. G06F 7/38
[52] U.S. Cl. ..................................................... 364/736
[58] Field of Search ................ 364/736, 754, 752–760, 364/748

[56] References Cited

U.S. PATENT DOCUMENTS 4,405,992  9/1983  Blau et al. ............................ 364/748
4,467,444  8/1984  Harmon, Jr. et al. ............... 364/900

FOREIGN PATENT DOCUMENTS 0042452  12/1981  European Pat. Off. ............ 364/736
181834  9/1985  Japan .................................... 364/736

Primary Examiner—Gary V. Harkcom
Assistant Examiner—Tan V. Mai
Attorney, Agent, or Firm—Michael F. Oglo; Julian C. Renfro

[57] ABSTRACT

A device which includes an arithmetic logic unit and a data shifter—e.f. a barrel shifter. The outputs of these are cross-coupled to their inputs by separate feedback connections. A third feedback connection is provided between the output of the arithmetic logic unit and another of its inputs. For added versatility in operation, registers at the output of the arithmetic logic unit and the barrel shifter may include each a selectable by-pass and/or additional registers may be included in parallel therewith. The device is reconfigured by the control of input multiplexers interposed between the feedback connections and the arithmetic logic unit and the barrel shifter.

10 Claims, 4 Drawing Sheets

ARITHMETIC LOGIC AND SHIFT DEVICE

FIELD OF THE INVENTION

The present invention concerns improvements in or relating to arithmetic logic and shift devices, and in particular the architecture of arithmetic logic unit and shift unit circuits. Such units may be combined so to provide ADD-then-SHIFT, SHIFT-then-ADD, or SHIFT-then-ACCUMULATE digital signal processing (DSP) operations.

BACKGROUND TO THE INVENTION

It is known, for example, to incorporate a shift register in the feedback loop of an arithmetic logic unit, so to provide a circuit that can perform ADD-then-SHIFT operations. By way of example a typical arrangement is shown in FIG. 1. Here, a 4-bit parallel binary accumulator is shown in which a shift register 1 is interposed in the path between the output of an arithmetic logic unit 3 and one of its inputs. It is noted that for the configuration shown, data can be shifted only one bit at a time and that for 16-bit data signal processing a number of such devices have to be connected in cascade.

In an alternative known arrangement, shown in FIG. 2, a 16-bit barrel shifter 5 is provided at one input of the arithmetic logic unit 3. This circuit includes an accumulating register 7 and a 16-bit data latch 9 each of which is connected in parallel to the output of the arithmetic logic unit 3 and to the circuit data input by means of a two-way connective path. The outputs from the register 7 and from the latch are selected and referred to the remaining input of the arithmetic logic unit 3 and the barrel shifter 5 by controlled multiplexers 11 and 13. It is noted that in this configuration only SHIFT-then-ADD operation is afforded, the barrel shifter will operate but once to perform a 16-bit shift, and that the arithmetic logic unit and barrel shifter operations are interdependent.

A known and more versatile combination of arithmetic logic circuit and barrel shifter is shown in FIG. 3. In this combination the arithmetic logic unit 3 and the barrel shifter 5 are each followed by a register 15, 17 and the output of each register is channeled onto a common feedback line 19 by means of a first multiplexer 21. A further multiplexer 23 and an output enable gate 25 is also connected in parallel to the first multiplexer 21 so that signal may be channeled to the device output. Data input signals X, Y, as also feedback signal channeled via the first multiplexer 21, are channeled to the inputs of the arithmetic logic unit 3 and barrel shifter 5 by means of a network of yet further multiplexers 27 to 37, some six in number. This device is capable of both SHIFT-then-ADD and ADD-then-SHIFT operations and furthermore the arithmetic logic unit 3 and barrel shifter 5 may be operated independently. However, a particular disadvantage of this configuration is that it requires not one but two clock cycles in order to feedback the contents of both registers 15, 17. Thus SHIFT-AND-ACCUMULATE operation is relatively slow and is less than wholly satisfactory for high performance applications. The inordinately large number of multiplexers—i.e. high parts count, is likewise noted.

SUMMARY OF THE INVENTION

It is an object of the present invention to provide a reconfigurable, high performance, arithmetic logic and shift device capable of ADD-then-SHIFT, and SHIFT then ADD or ACCUMULATE operations, while also being reconfigurable to perform independent arithmetic logic and shift operations simultaneously and without loss of throughput.

In accordance with the invention thus there is provided an arithmetic logic and shift device including an arithmetic logic unit;
first and second input multiplexers connected to respective inputs of this arithmetic logic unit;
a data shifter;
a third input multiplexer connected to an input of this data shifter;
a first connective feedback path connected to the third input multiplexer to feedback data output from the arithmetic logic unit;
a second and independent connective feedback path connected to the second input multiplexer to feedback data output from the data shifter; and
a third and independent connective feedback path connected to the first input multiplexer to feedback data output from the arithmetic logic unit.

In the configuration aforesaid, since feedback in each case is independent, arithmetic and shift operation, and in particular, accumulation, may be performed without loss of throughput.

It is convenient to employ a barrel shifter as the data shifter aforesaid.

It is furthermore convenient to provide registers at the respective outputs of the arithmetic logic unit and the data shifter, these being connected between these outputs and respective feedback paths.

For extended versatility, it is advantageous to provide each output register aforesaid with a selectable by-pass. Alternatively, or in addition to this, registers may be added in parallel to the output registers aforesaid.

BRIEF INTRODUCTION OF THE DRAWINGS

In the drawings accompanying this specification:

DESCRIPTION OF A PREFERRED EMBODIMENT

So that this invention may be better understood, an embodiment thereof will now be described and reference will be made to FIGS. 4 to 7 of the accompanying drawings. The description that follows is given by way of example only.

Figure 1:
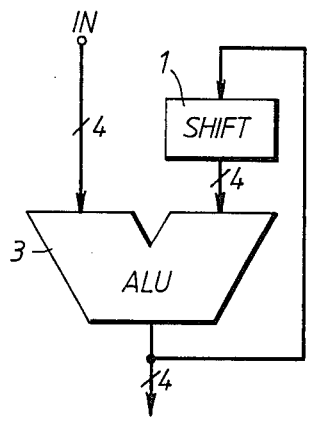
FIGS. 1 to 3 are block schematic drawings showing different configurations of known arithmetic logic and shift devices.
Figure 2:
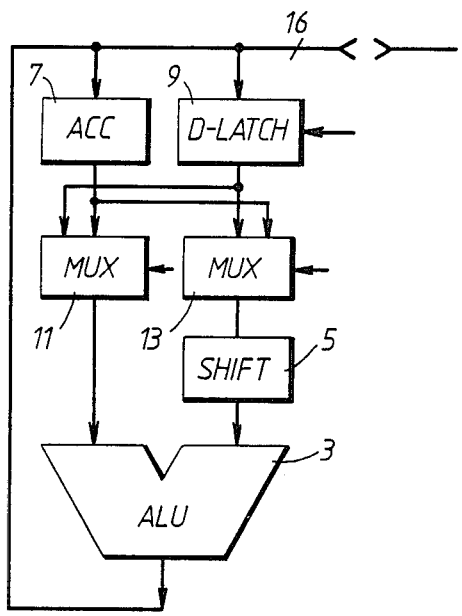
Figure 3:
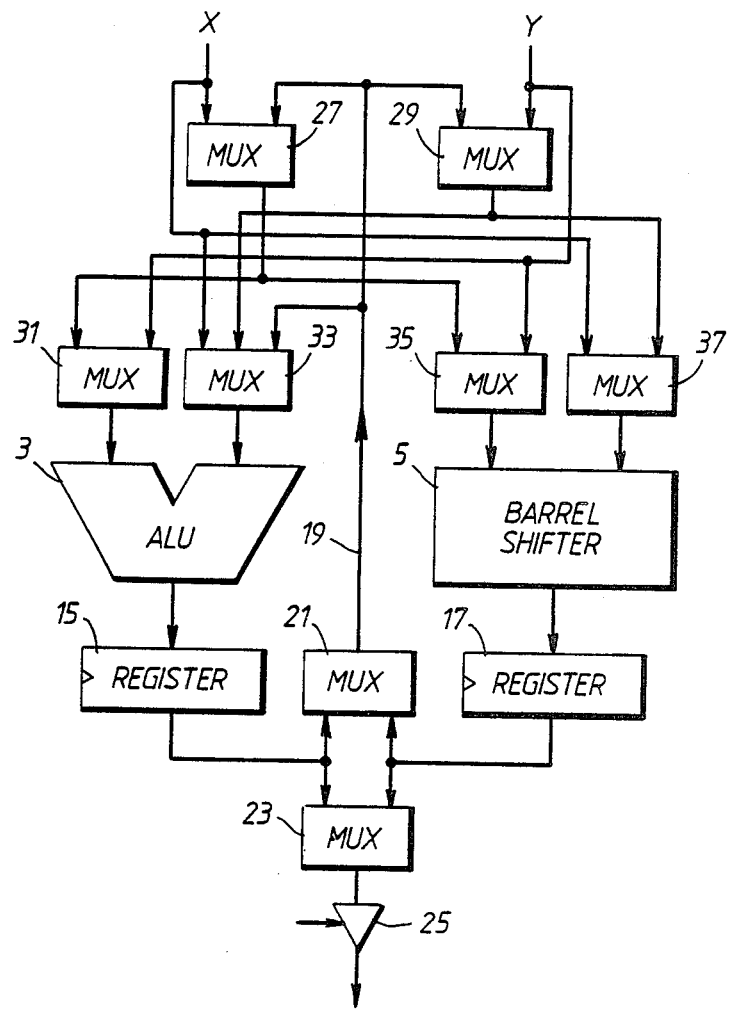
Figure 4:
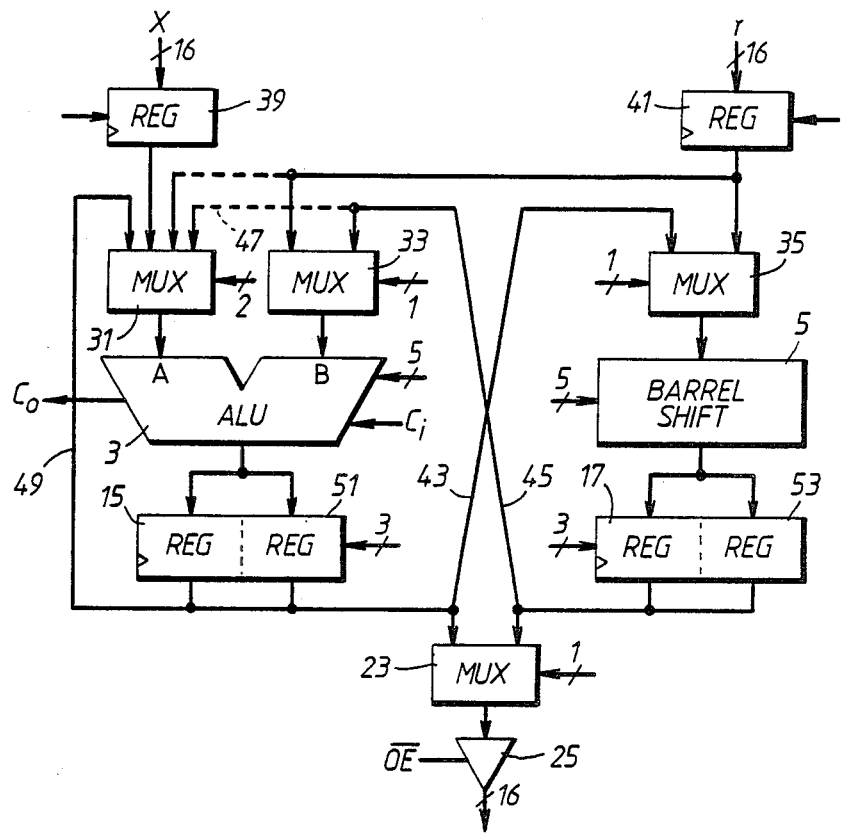
FIG. 4 is a block schematic drawing of a modified configuration arithmetic logic and shift device, an embodiment of this invention.

The device shown in FIG. 4 comprises an arithmetic logic unit 3 and a barrel shifter 5 each of which is followed by an output register 15 and 17, respectively, and each is connected thence via an output multiplexer 23 and an output enable gate 25 to the output of the device. Input data X, Y is stored by means of input registers 39 and 41. The arithmetic logic unit 3 is preceded by a pair of input multiplexers 31 and 33, one connected to each input A and B, respectively. The X and Y input registers 39 and 41 are in turn connected to respective input multiplexers 31 and 33 and, as a further optional feature, the Y input register 41 is also connected to the first of the input multiplexers, multiplexer 31. The Y input register 41 is also connected to the barrel shifter 5 via a third input multiplexer 35. A distinctive feature of this design of device is that the data output by the arithmetic logic unit 3 and by the barrel shifter 5 is independently channeled to the inputs of the barrel shifter 5 and arithmetic logic unit 3, respectively. A connective feedback path 43 thus is provided between the output of the output of the register 15 of the arithmetic logic unit 3 and an input of an input multiplexer 35 of the barrel shifter 5. A separate connective feedback path 45 provides connection between the output register 17 of the barrel shifter 5 and an input of one of the input multiplexers, multiplexer 33, preceding the arithmetic logic unit 3. An important consequence of this configuration is that data can be channeled from the arithmetic unit 3 to the barrel shifter 5 without any impediment to the flow of data from the barrel shifter 5 to the arithmetic unit 3. Capability for high data throughput is therefore preserved. It will also be noted from FIG. 4 that an optional connection 47 is provided between the output register 17 of the barrel shifter 5 and an input of the remaining multiplexer, of the arithmetic logic unit 3, multiplexer 31. This affords further versatility. To facilitate accumulator operation, a third and separate connective feedback path 49 is provided between the output register 15 of the arithmetic logic unit 3 and one of the input multiplexers, of the same, mulitplexer 31.

By way of an enhancement, a selectable by-pass may be provided across one or both output registers 15 and 17. An advantage of this provision is that data may be passed on, eg to device output, without destroying the register contents. The contents, thus, are then available for use at a later time.

As an alternative, or as an additional enhancement, one or more additional selectable registers 51 and 53 may be added in parallel to the output registers 15 and 17. It is thus possible to increase data storage, and capability is thus provided for storing the same data in separate locations. It is noted that the numbers of registers incorporated at the outputs of the arithmetic logic unit 3 and the barrel shifter 5 need not be the same.

Depending upon the control signals that are applied to the three input multiplexers 31, 33 and 35 and to the output multiplexer 23, the device of FIG. 4 may be configured to perform various logic and shift operations:

ADD-then-SHIFT

Figure 5:
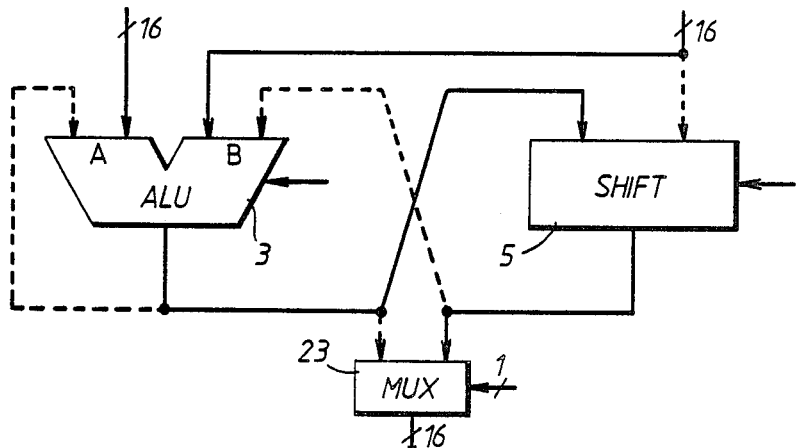
FIGS. 5, 6 and 7 are simplified block schematic drawings of the device shown in the previous figure, this showing the data paths selected for ADD-then-SHIFT, SHIFT-then-ADD, and SHIFT-and-ACCUMULATE operations, respectively.

In FIG. 5 the first input multiplexer 31 is controlled to pass data from the X-register 39 to the A-input of the arithmetic logic unit 3. The second input multiplexer 33 is controlled to pass data from the Y-register 41 to the B-input of the same 3, while the third input multiplexer 35 is controlled to as data from the output register 15 of the arithmetic unit 3 to the input of the barrel shifter 5. Both the output multiplexer 23 and the output enable gate 25 are controlled to pass data to the output. X-data and Y-data is thus added by the arithmetic logic unit and then shifted by means of the barrel shifter 5, before being channeled to output.

SHIFT-then-ADD

Figure 6:
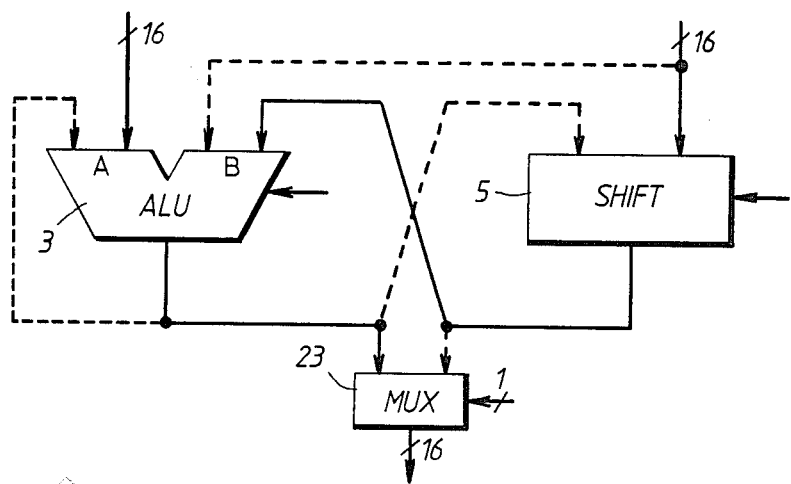

In FIG. 6, X-data and Y-data are passed by the first and third input multiplexers 31 and 35 respectively. Data output from the barrel shifter 5 is passed by the second input multiplexer 33. Y-data is thus shifted and added to X-data before being extracted at the device output.

SHIFT-then-ACCUMULATE

Figure 7:
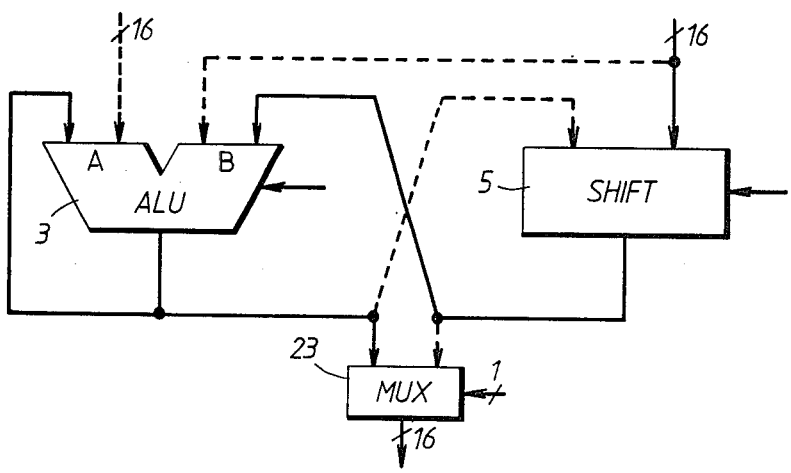

In FIG. 7, Y-data is passed by the third input multiplexer 35, shifted by the barrel shifter 5 and presented to the B-input of the arithmetic logic unit 3 via the second input multiplexer 33. At the same time, data stored in the output register 15, of the arithmetic logic unit 3, here serving as an accumulating register, is passed by the first input multiplexer 31 and presented to the A-input of the arithmetic logic unit 3. A and B input data is added and thus accumulated in the output register 15 of the arithmetic logic unit 3. It is noted that in this operation, since the routing of data from the two output registers is separate, there is no impediment to throughput.

It will also be noted that since the arithmetic logic unit 3 and the barrel shifter 5 are independent, they may be employed to perform parallel tasks—i.e. they can operate upon different data inputs at the same time.

It will be appreciated that, at the loss of versatility, it is possible to replace selected input multiplexers by direct connections.

What is claimed is:

1. An arithmetic logic and shift device comprising:
   an arithmetic logic unit;
   first and second input multiplexers connected to respective inputs of said arithmetic logic unit;
   a data shift means;
   a third input multiplexer connected to an input of said data shift means;
   first and second data input ports connected respectively to an input of the first input multiplexer and to an input of the third input multiplexer;
   a first connective feedback path connected to the third input multiplexer to feedback data output from the arithmetic logic unit;
   a second and independent connective feedback path connected to the second input multiplexer to feedback data output from the data shift means;
   a third and independent connective feedback path connected to the first input multiplexer to feedback only data output from the arithmetic logic unit;
   a data output port; and
   an output multiplexer, connected at respective inputs to receive data from the arithmetic logic unit and from said data shift mean, and connected at output to the data output port to select and pass data thereto.

2. A device, as claimed in claim 1, wherein the data shift means is a barrel shifter.

3. A device, as claimed in claim 1, wherein an output register is interposed between the arithmetic logic unit and the first and third feedback paths.

4. A device, as claimed in claim 3, wherein the output register is provided with a by-pass.

5. A device, as claimed in claim 3, wherein at least one additional output register is connected in parallel to said output register.

6. A device, as claimed in claim 1, wherein an output register is interposed between the data shift means and the second feedback path.

7. A device, as claimed in claim 6, wherein the output register is provided with a by-pass.

8. A device, as claimed in claim 6, wherein at least one additional output register is connected in parallel to said output register.

9. An arithmetic logic and shift device comprising:
an arithmetic logic unit;
first and second input multiplexers connected to respective inputs of said arithmetic logic unit;
first and second output registers connected in parallel to an output of the arithmetic logic unit;
a barrel shifter;
a third input multiplexer connected to an input of said barrel shifter;
first and second data input ports connected respectively to an input of the first input multiplexer and to an input of the third multiplexer;
third and fourth output registers connected in parallel to an output of the barrel shifter;
a first connective feedback path connected between the third input multiplexer and the first and second output registers;
a second and independent feedback path connected between the second input multiplexer and the third and fourth output registers;
a third and independent feedback path connected between the first input multiplexer and the first and second output registers;
a first data input register connected to the first input multiplexer;
a second data input register connected to the both second and third input multiplexer;
an output connected at respective inputs to the first and second, third and fourth, output registers;
an output port; and
an output enable gate connected between the output port and an output of the output multiplexer.

10. A device, as claimed in claim 9, wherein the second input register is connected to all three first, second, and third, input multiplexers; and, the third and fourth output registers are connected to both first and second input multiplexers.

* * * * *